United States Patent [19]

Orimo et al.

[11] Patent Number: 4,681,457
[45] Date of Patent: Jul. 21, 1987

[54] CONTINUOUS MIXER

[75] Inventors: Taiji Orimo; Tsugushi Fukui; Shinichi Fukumizu, all of Kobe, Japan

[73] Assignee: Kabushiki Kaisha Kobe Seiko Sho, Kobe, Japan

[21] Appl. No.: 778,227

[22] Filed: Sep. 20, 1985

[30] Foreign Application Priority Data

May 14, 1985 [JP] Japan ................................. 60-103192
May 20, 1985 [JP] Japan ................................. 60-107999

[51] Int. Cl.$^4$ .............................................. B01F 7/08
[52] U.S. Cl. ...................................... 366/84; 366/323
[58] Field of Search ...................... 366/83, 84, 85, 89, 366/90, 79, 86, 88, 91, 96, 97, 297, 298, 300, 301, 323; 425/207, 208, 209

[56] References Cited

U.S. PATENT DOCUMENTS

3,764,118 10/1973 Matsuoka .............................. 366/84
4,199,263  4/1980 Menges ................................ 366/90
4,581,992  4/1986 Koch ................................... 366/90

Primary Examiner—Robert W. Jenkins
Attorney, Agent, or Firm—Oblon, Fisher, Spivak, McClelland & Maier

[57] ABSTRACT

Disclosed is a two-shaft continuous mixer used for homogenization of plastics, manufacture of compounds of composite plastics and the like. A mixing control apparatus is also provided, in which a gear pump as a material discharge mechanism is directly coupled to a material discharge opening, in which apparatus, a mixing degree is positively controlled within the mixer under the constant feed condition of the pump over the wide range of viscosities under the stabilized operation. Movable dams are also provided.

8 Claims, 15 Drawing Figures

CONTINUOUS MIXER

BACKGROUND OF THE INVENTION

1. Field of the Invention

The present invention relates to a two-shaft continuous mixer, and more particularly to a two-shaft continuous mixer used for homogenization of plastics, master batch, manufacture of compounds of composite plastics, and the like.

The present invention further provides a continuous mixer in which a plastic material such as various plastics, rubber, etc., is mixed and made molten into a flowing state, which material is supplied to granulation equipment or the like. In particular, in an apparatus of the type in which a gear pump as a material discharge means is directly connected to a material discharge opening, the mixing degree is positively controlled within the mixer under the constant feed condition of the gear pump to thereby perform proper and good mixing over the wide range of viscosity under the stabilized operation, thus providing enhancement and stability of quality.

2. Description of the Prior Art

As prior art there have been previously disclosed U.S. Pat. Nos. 315,408, 3,704,866, 4,310,251 and 4,452,750.

Recently, a continuous mixer with a gear pump (with closed coupling) has been used, which is of the energy saving type, in place of a continuous mixer with an extruder (with open chute). However, in a system which makes use of pressure control of the continuous mixer with a gear pump, it is difficult to control resins from a low viscosity to a high viscosity. In order to make the wide range of resins applicable, the present inventors have proposed (1) a change in shape of a rotor itself and (2) an addition of the control means for pressure control of the continuous mixer with a gear pump. Of these, the change in shape of the rotor is the technique which can be also applied not only to the continuous mixer with a gear pump but to the continuous mixer with an extruder.

There is a conventional two-shaft continuous mixer which comprises on one side in an axial direction a material supply portion adapted to receive a measured material, and on the other end in an axial direction two rotors having a feed screw portion and a mixing blade portion, said rotors being disposed within a mixing portion extending in a horizontal direction and having a discharge portion, said rotors being arranged in parallel but which are not meshed with each other and are rotatable in different directions.

In this mixer, material in the screw portion of the rotor is continuously fed to the mixing portion, where the material is well mixed through the shearing action between the rotor and the inner surface of the mixing portion (chamber), the force-back action obtained by the special shape of rotors, kneading by mutual action of two rotors, and scattering action, the mixed material is fed to the discharge portion by the pumping action in the rotor discharge portion, and the quality of mixing is controlled by adjusting the degree of opening of an orifice gate.

The rotor in the mixer constructed as described above is designed as shown in FIGS. 5 and 6.

Figure 5:
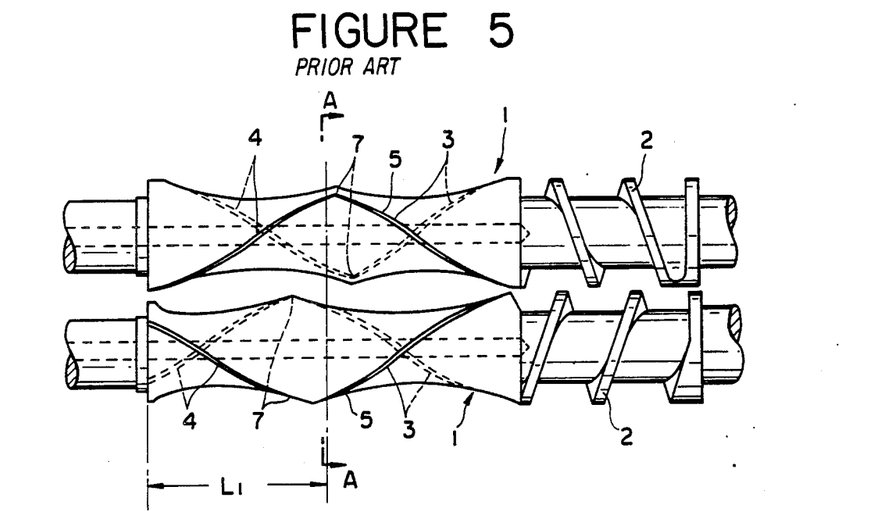
FIG. 5 is a plan view of a conventional rotor.
Figure 6:
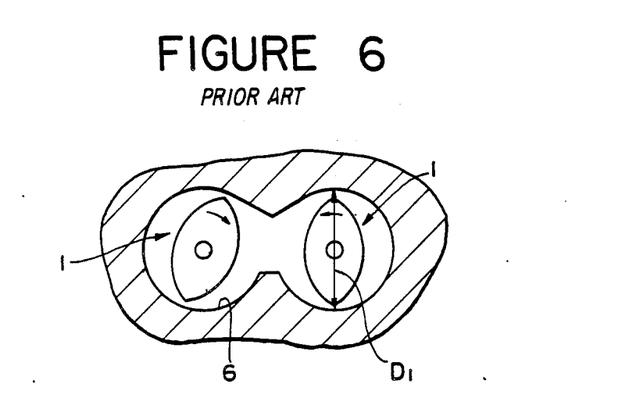
FIG. 6 is a sectional view taken on line A—A of FIG. 5.

A rotor 1 comprises a feed screw portion 2 and a mixing blade portion 5 which comprises a helical feed blade 3 and a helical return blade 4, said feed screw portion 2 and said mixing blade portion 5 being disposed in an axial direction.

The two rotors 1 are disposed parallel to each other and are rotatable in different directions within the mixing portion 6 substantially in the form of glasses.

The feed blade 3 and the return blade 4 are respectively of the double type and their helical configuration is continuous in an axial direction. In each rotor 1, an intersection 7 between the terminating end of the feed blade 3 and the beginning end of the return blade 4 is axially deviated and an intersection 7 between the two rotors 1 is also deviated. Axial length $L_1$ from the discharge end of the rotor to a portion, being the average value of the two intersections 7, is 1.66 D with respect to the inside diameter $D_1$ of the mixing portion 6. The two rotors 1 are asymmetrical with respect to each other, and the number of revolutions thereof is in the speed ratio of approximately 1 : 1.14.

A continuous mixer for various rubber and plastic materials has been known which is of the type wherein a gear pump is directly connected to a discharge opening for the already mixed material for discharging and transporting the material and to favorably influence the mixed material by changing the rotational speed. Prior art of this kind include Japanese Patent Publication No. 3091/81, though not shown, which discloses that a gear pump driven by a variable speed motor is directly connected to a material discharge opening in the mixer to thereby vary the rotational speed of the gear pump and vary inlet pressure of a pump (or an extruder) whereby a filling degree of material within the mixer is varied (i.e., a wetted surface is varied) to control the strength of mixing; and Japanese Patent Application Laid-Open No. No. 183210/83, though not shown therein, which discloses that the continuous mixer is directly connected to the gear pump, an immovable fixed dam which is projected into a space between the known mixing rotors provided parallel with each other is provided within a chamber in the vicinity of a discharge opening of the mixer, in an attempt to cope with the case where the stabilized operation is rendered difficult resulting from a great fluctuation of pressure (occurrence of hunting phenomenon), to interrupt an axial flow of the mixed material, thus reducing the pressure hunting and thereby obtaining the stabilized operating condition.

In the two-shaft continuous mixer which uses the rotors 1 shown in FIGS. 5 and 6, since the zone of the shearing action by the mixing blade portion 5 is lengthy, resin the temperature exceeds 250° C. if polyethylene of high density is used. In particular, this phenomenon is significantly affected by the aforementioned $L_1$, and accordingly, there is posed a problem of using such a material as just mentioned. Furthermore, the speed ratio is different between the rotors 1, and the feed blade 3 and the return blade 4 are continous in the form of an axial helical configuration and are asymmetrical. Therefore, kneaded spots likely occur and good homogenization is not expected.

More specifically, a short path due to the continuous blades occurs, which possibly leads to formation of nonmolten resin when linear polyethylene of low density is used.

In the current situation which involves the wide range of characteristics of plastic such as superhigh viscosity and superlow viscosity, the two-shaft continuous mixer is an exclusive-use machine despite the fact that a multi-function for uniformly mixing various materials is requested, and the mixer merely has a single function, thus failing to enlarge the possible uses thereof.

The above-described two prior art references, Japanese Patent Publication No. 3091/81 and Japanese Patent Application Laid-Open No. 183210/83 may be summarized as follows: In Japanese Patent Publication No. 3091/81, theoretically a good result should be obtained by the system disclosed therein but actually plastic materials to be handled are multifarious, and the properties thereof are delicately different from one another and the conditions therefor are also different. Therefore, the discharge pressure is materially varied, sometimes failing to achieve the stabilized operation. It can be said that Japanese Patent Application Laid-Open No. 183210/83 has been proposed as an improvement to solve the aforesaid problem. However, only these prior arts are not sufficient to solve the remaining problems which still need be solved regarding the following points. The greater part of the plastic materials used in the continuous mixer comprise plastic materials such as rubber, plastics, etc. These materials, however, have an extremely wide range of viscosity from an extremely low viscosity to an extremely high viscosity. This viscosity is the factor which greatly influences the mixing content and flowing condition of material, which is very difficult to adequately cover all the materials only be varying the rotational speed in the gear pump. Even if an immovable fixed dam is provided within the chamber in addition to the gear pump to interrupt the axial flow of material, there still is posed a problem described in the following discussion: For example, where high viscosity resin material is used, heat generation of the material is great due to the presence of the fixed dam, and therefore it is necessary to minimize the discharge pressure thereof but this provides a variation in engagement of the teeth, resulting in a failure of expecting stabilized operation. In addition, pump surging or the like causes, for example, unevenness of pellets in the granulation equipment to which the material is fed, and mechanical vibrations occur. Where the low viscosity resin material is used, only the heat generation of material due to the presence of the fixed dam is insufficient, and therefore, if the set pressure is increased, the resin material leaks out of a sealed portion, and a feed neck due to a counterflow of the molten resin occurs. These troubles are difficult to be solved when using only the aforesaid prior art references.

SUMMARY OF THE INVENTION

It is an object of the present invention to provide a two-shaft continuous mixer in which a mixing blade, more particularly a feed blade and a return blade, are made axially discontinuous in shape, an intersection (apex position) between both the blades is specifically determined, and two rotors are made symmetrical and driven at a uniform speed to ensure uniform mixing and stabilized continuous operation irrespective of super high viscosity or super low viscosity.

According to the present invention, there is provided a two-shaft continuous mixer comprising an axially horizontally extending mixing portion 10 having a material supply portion 11 on one end in an axial direction and a discharge portion 12 on the other end in an axial direction; a rotor 14 comprising a feed screw portion 15 and a mixing blade portion 18 composed of a helical feed blade 16 and a helical return blade 17, said feed blade and said return blade being disposed in an axial direction; two shafts of said rotors 14 being arranged within said mixing portion 10 with said feed screw portion 15 positioned on the side of said material supply portion 11 so that said two shafts are disposed parallel to each other, are not in engagement and are rotatable in different directions, whereby a terminating end 16A of the feed blade 16 in the mixing blade portion 18 and a beginning end 17A of the return blade 17 are deviated in phase in a circumferential direction on a plane traversing the rotor shaft, an axial length L from the discharge end in the rotor 14 to an apex position at which the terminating and beginning ends 16A, 17A of said blades are positioned on the plane being 1.3 D to 1.6 D with respect to the inside diameter D of the mixing portion 10, and the rotors 14 in the form of a two-shaft are disposed symmetrically in the mixing portion 10, and, wherein a driving portion 19 for rotating the rotors 14 at uniform speed is provided.

In the continuous mixer, material is supplied from a measuring unit to a material supply portion 11 through a hopper.

A screw portion 15 of the rotor 14 feeds the entered material to the mixing portion continuously.

The material undergoes a powerful shearing action between the rotors 14 in the mixing portion and the mixing portion 10 or the inner surface of the chamber and the force-return action by the feed blade 16 and the return blade 17 in the mixing blade portion 18, and the material further undergoes kneading by mutual action of two rotors 14 and uniform mixing by the scattering action. In this case, a terminating end 16A of the feed blade 16 and a beginning end 17A of the return blade 17 are deviated in phase in a circumferential direction on a plane to prevent slip-out of material due to the dam effect.

The axial length L between an intersection or an apex position, between the terminating end 16A of the feed blade 16 and the beginning end 17A of the return blade 17, and the discharge end is set to be 1.3 D to 1.6 D, whereby the shearing action of the rotors 14 is decreased thus rendering mixing at low temperature possible.

Since the two rotors 14 are arranged symmetrically and are rotated at uniform speed, the apex position of each rotor 14 is not deviated in an axial direction but remains at the same position, the occurrence of an irregular temperature is decreased, and uniform mixing may be accomplished so as to prevent irregular mixing.

In this manner, the sufficiently mixed material is fed to the discharge portion 12 by the pumping action of the rotor discharge portion, and the mixing quality is controlled by adjusting an opening degree of a gate 23 provided on the discharge portion 12.

As described above, in the present invention, since the terminating end 16A of the feed blade 16 in the mixing blade portion 18 in the rotor 14 and the beginning end 17A of the return blade 17 are deviated in phase in a circumferential direction on the plane traversing the rotor shaft, slip-out of material is prevented due to the dam effect and the stability of uniform mixing can be enhanced.

Further, the axial length L from the discharge end in the rotor 14 to the apex position at which the terminating and beginning ends 16A, 17A of the blades are positioned on the plane is set to be 1.3 D to 1.6 D with respect to the inside diameter D of the mixing portion 10, and therefore, the zone of shearing action is shortened and correspondingly, low heat generation can be provided. Moreover, since two shafts of the rotors 14 are disposed symmetrically in the mixing portion 10 and the driving portion 19 is provided for rotating the rotors 14 at uniform speed, it is possible to prevent irregularity of temperature and irregularity of mixing. That is, in mixing the high viscosity resin material, in the present invention, a low temperature of 20° C. is used as compared with that of the prior art, thus rendering mixing at low temperature possible.

In addition, in mixing the resin material at low viscosity, in the prior art, unmolten resins remain in abundance during the mixing at a temperature less than 180° C., for example, resulting in difficulty in performing stabilized operation, whereas in the present invention, the stabilized operation for a long period of time is assured.

Accordingly, it is assured in the present invention that uniform mixing, that is, pulverizing, melting, mixing and scattering, are performed with respect to a wide range of resins irrespective of resins of high viscosity or low viscosity by a single mixer.

In accordance with another aspect of the present invention, the present invention eliminates the prior art in which the discharge pressure of material at an inlet of a gear pump is set to a value necessary for stabilized operation of the gear pump and such value is varied to vary the temperature of material during operation. In the present invention, the feed condition in the gear pump is always maintained constant, and variation in shear area and variation in filling degree in the mixer are positively accomplished by a movable dam provided in a chamber adjustably with respect to an amount of projection, namely, the mixing degree is positively adjusted within the mixer to thereby obtain stabilized and effective operation, thus solving the aforesaid problems. According to the invention there is provided a mixing control apparatus in a continuous mixer comprising two mixing rotors having a plurality of mixing blades, said rotors being arranged parallel with each other within a chamber having a material supply opening on one end and a material discharge opening on the other end, the material continuously supplied through said material supply opening being mixed by said rotors and discharged out of the material discharge opening, and a gear pump as a discharge control means directly coupled to said material discharge opening, said apparatus comprising a material mixing-degree adjusting movable dam provided in said chamber, said movable dam being projected into a space between the mixing blades of both the rotors so that the amount of projection thereof may be adjusted.

Figure 8:
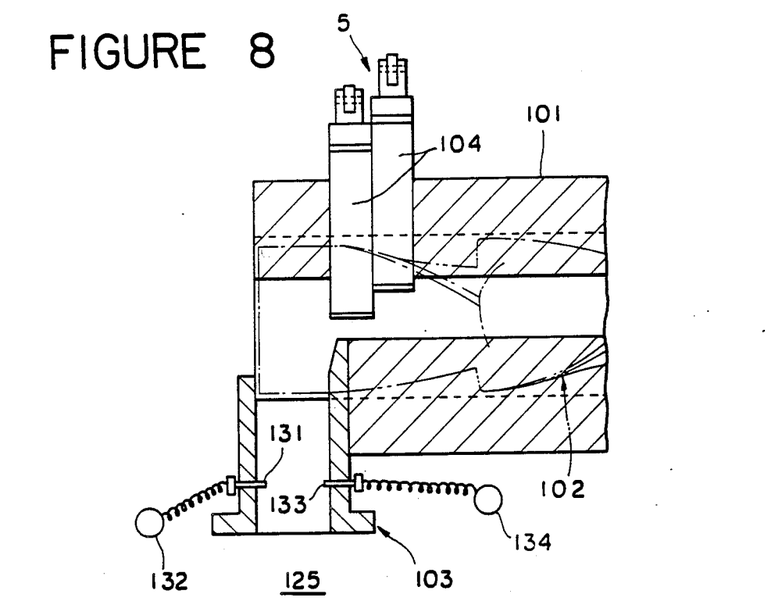
FIG. 8 is a front view in section showing essential parts of an embodiment of apparatus according to the present invention.
Figure 9:
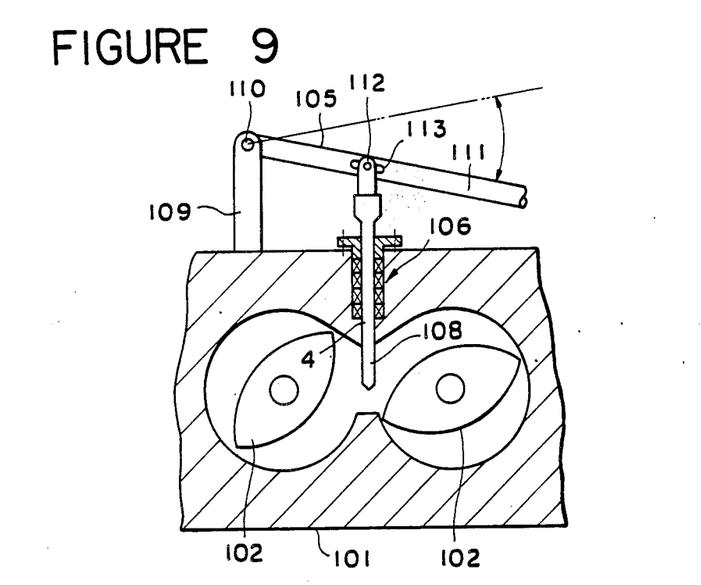
FIG. 9 is a side view in section of the embodiment of FIG. 8.
Figure 10:
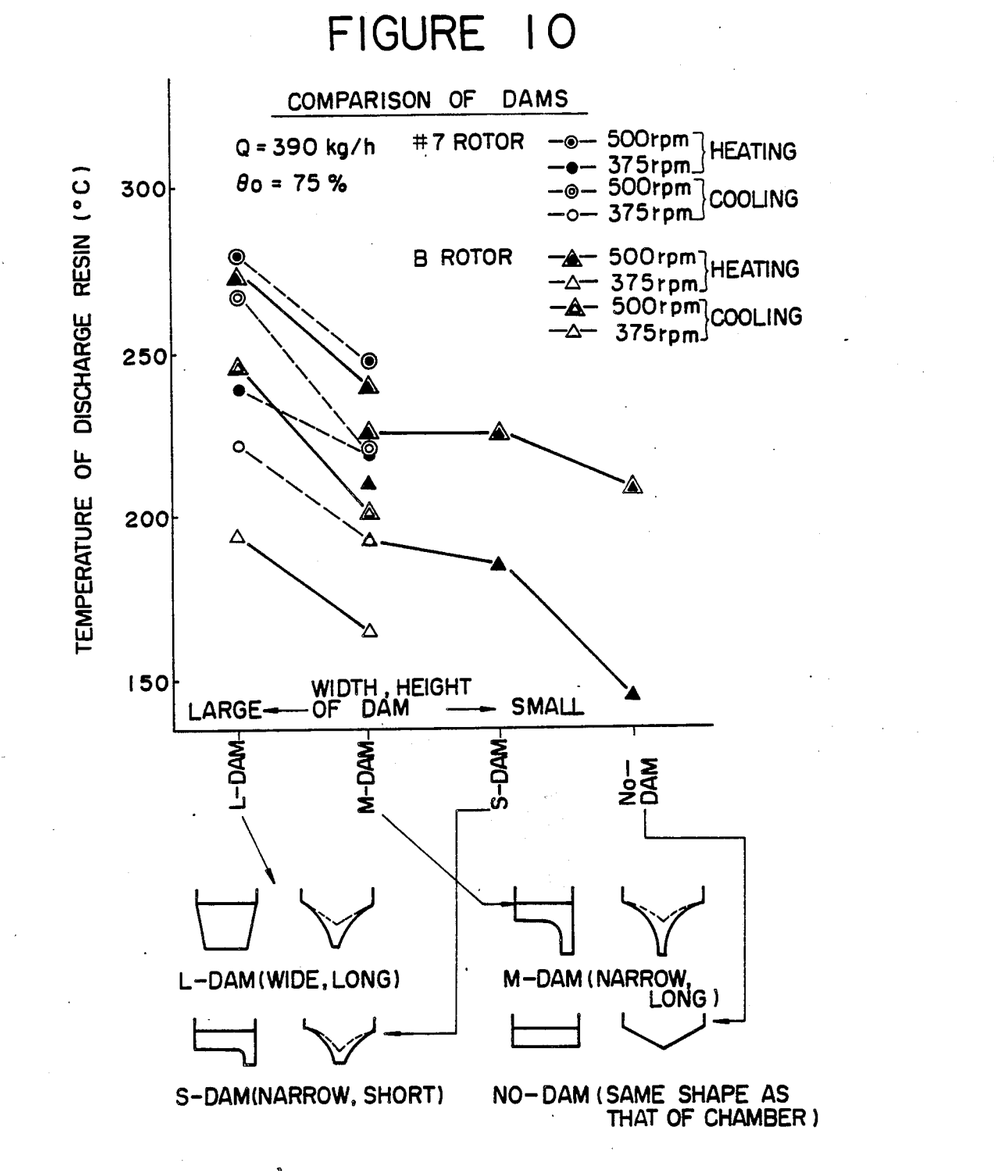
FIG. 10 is a comparison graph showing the dam configuration and the change in mixing degree.

In accordance with the mixing control apparatus of the present invention, as shown in FIGS. 8 and 9, which merely show essential parts, in a chamber 101 wherein two mixing rotors 102, 102 in the known continuous mixer are disposed parallel with each other and are movable, one or more plate-like or bar-like movable dams 104 (two dams in the illustrated embodiment) are disposed, in the vicinity of a discharge opening 103 for the mixed material, within a space 107 between the mixing blades of the rotors 102, 102 so that the amount of projection at the lower end of the dams 104 may be adjusted by a suitable driving device 105, thus providing the following operation. FIG. 10 is a comparison graph showing the state where the configuration of the dam can be changed to considerably greatly change a mixing degree of resin material to be mixed. The axis of ordinate indicates the temperature of resin material at the discharge opening 103 for the mixed material, and the axis of abscissa indicates the dams in the form of L dam, M dam, S dam and No dam in order of size which are different in width and height thereof. The dams have their shapes as indicated by arrows at the lower portion of the graph. It has been confirmed as the result of mixing under the same condition using dams different in shape from each other that a considerably great change in mixing degree may be obtained as will be apparent from transition of geometrical figures of marks. Unlike the immovably positioned fixed dams used in prior art, in the present invention, the movable dams 104 are used so that the amount of projection thereof within the chamber 101 may be freely changed to thereby make it possible to positively provide a change in shear area and a change in filling degree within the chamber 101. Thus, by this change in position of the movable dams 104, it is possible to adequately perform adjustment of the mixing degree according to the material. At the same time, this means that in the gear pump directly coupled to the discharge opening 103, material pressure upstream of the pump inlet may be merely controlled to a given value necessary for stabilized operation of the gear pump, that is, to a rotational speed for maintaining the filling (clogging) state of material at the discharge opening 103 since the material at the discharge opening 103 is smoothly attracted by the rotation of the pump and is continuously transported to the succeeding step. This enables operation of the mixer which is set to a predetermined temperature or power by adjustment of the mixing degree by the movable dams 104. This arrangememt overcomes various problems noted above, namely, the matter that may not be covered merely by change in rotational speed of the gear pump, and the matter that may not be covered by the fixed dam, and more specifically, such problems as surging of the gear pump with respect to the high viscosity resin material, irregularity of pellets and mechanical vibrations caused thereby, leakage of resin material from a seal portion with respect to the low viscosity resin material, trouble in feed neck, and the like are overcome.

The apparatus of the present invention is extremely avantageous in that stabilized operation and mixing may be realized for various resin material having a wide range of viscosity, as compared with the prior art which merely depends on the change in rotational speed of the gear pump or the fixed dam is added. The apparatus of the present invention overcomes problems of the control of the mixing state by a change in the rotational speed of the gear pump resulting from the change in material pressure, and the problem involved in the high viscosity or low viscosity resin materials that may not be covered by the action of interrupting a flow of material within the chamber caused by the dams, that is, problems such as a difficulty in stabilized operation of the gear pump, leakage of molten resin, and a feedneck resulting due to the back flow of resin. The gear pump can perform its stabilized operation while maintaining the set rotational speed of a given pressure value, and the mixing within the chamber positively depends on the change in amount of projection of the movable dams. Temperature and power may be set to a predetermined value to cover the resin marerials of high and low viscosities without any trouble, thus providing excellent mixing control means of the type described.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will now be described in detail with reference to FIGS. 1 to 4.

Figure 1:
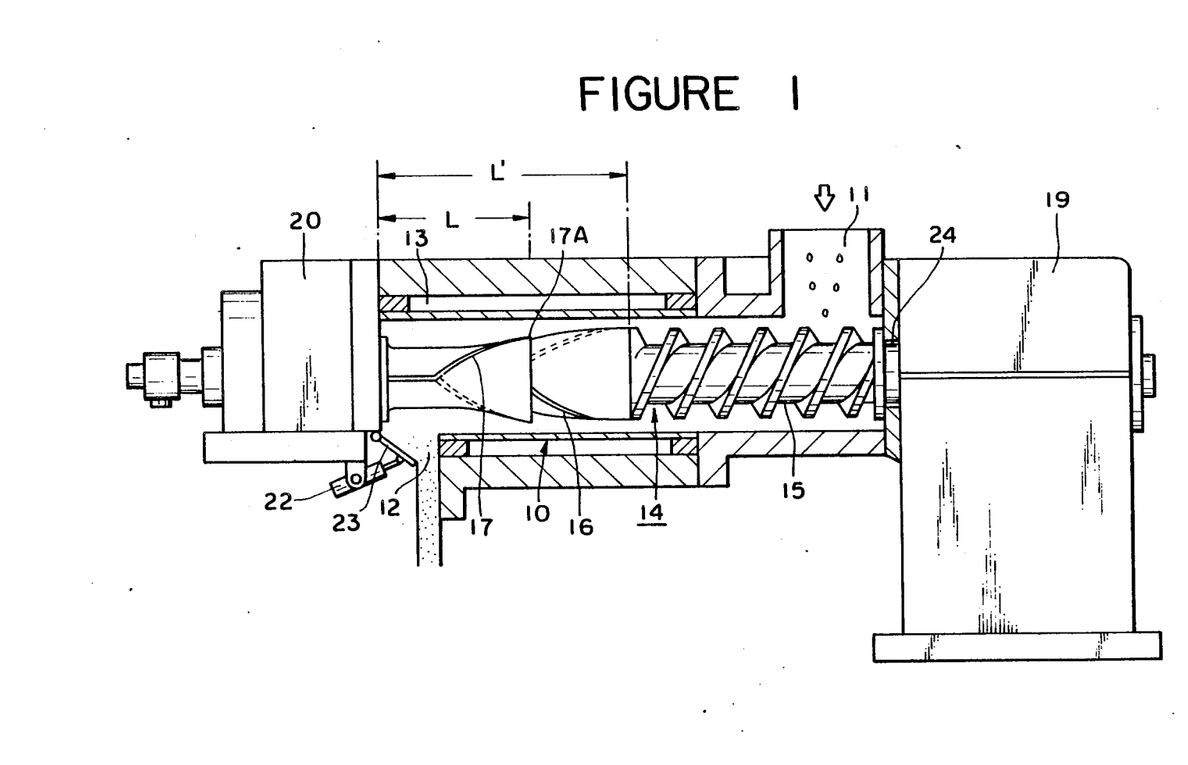
FIG. 1 is a sectional view of the mixer in accordance with the present invention.

A mixing portion indicated at 10 has an inner surface substantially in the form of glasses having the inside diameter D, the mixing portion being supported on a base plate not shown and extending in an axially horizontal direction.

The mixing portion 10 comprises a material supply portion 11 on one end in an axial direction and a discharge opening 12 on the other end in an axial direction. This mixing portion 10 is of the construction which is divided into two upper and lower portions, and comprises a jacket 13 for heating and cooling.

Figure 2:
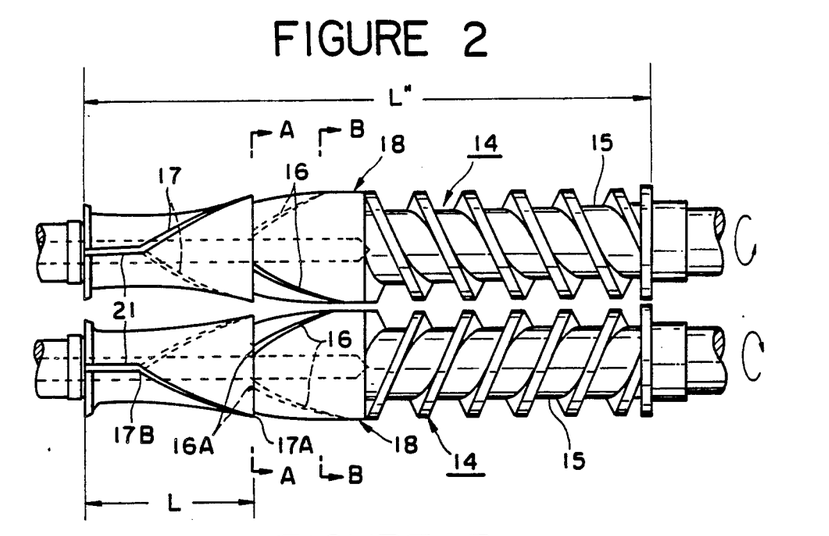
FIG. 2 is a plan view of a rotor.

A rotor indicated at 14 is composed of a feed screw portion 15 and a mixing blade portion 18 comprising a helical feed blade 16 and a return blade 17, said feed screw portion 15 and said mixing blade portion 18 being disposed in an axial direction. The two rotors 14 are disposed parallel with each other and inserted into the mixing portion 10.

More specifically, the rotors 14 are not in engagement with each other and are rotatably inserted in different directions with the feed screw portion 15 positioned on the side of the material supply portion 11, the rotors 14 having one end supported on a driving portion 19 and the other end supported on a water end portion 20, through bearings, respectively.

In the rotor 14, in the illustrated embodiment, the feed blade 16 comprises two blades and the return blade 17 also comprises two blades. A terminating end 16A of the feed blade 16 and a beginning end 17A of the return blade 17 are deviated in phase in a circumferential direction on the plane transversing the rotor shaft, deviated through 90° in the illustrated embodiment.

Furthermore, in the illustrated embodiment, the screw portion 15 comprises two screws. The mixing blade portion 18 has an axially parallel pump blade 21 followed by the terminating end 17B of the return blade 17 thereof. A torsional angle between the feed blade 16 and the return blade 17 is 30°, and a bite angle in the mixing blade portion 18 is 25°.

Axial length L from the discharge end in the rotor 14 to the apex position where the terminating and beginning ends 16A, 17A of the feed blade 16 and the return blade 17 is 1.3D–1.6D with respect to the inside diameter D of the mixing portion 10, and full length L' of the mixing blade portion 18 is 2.2D–2.8D with respect to the aforesaid inside diameter. The feed screw portion 15 is longer than the screw portion 2 in the above-described prior art shown in FIG. 5, thus increasing the ability to feed material by approximately 20%, The two rotors 14 are symmetrically inserted into the mixing portion 10 as shown in FIG. 2, and the apex position of the rotors 14 remains at the same position without being deviated in an axial direction.

Figure 3:
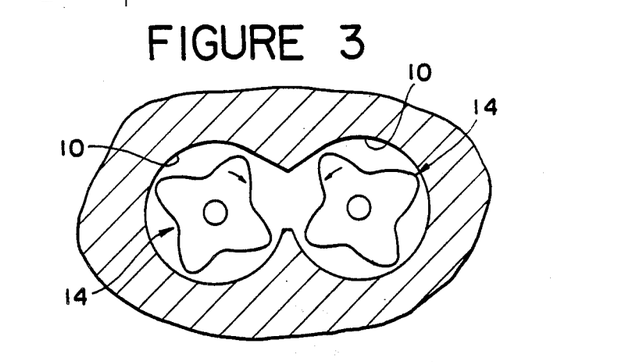
FIG. 3 is a sectional view taken on line A—A of FIG. 2.
Figure 4:
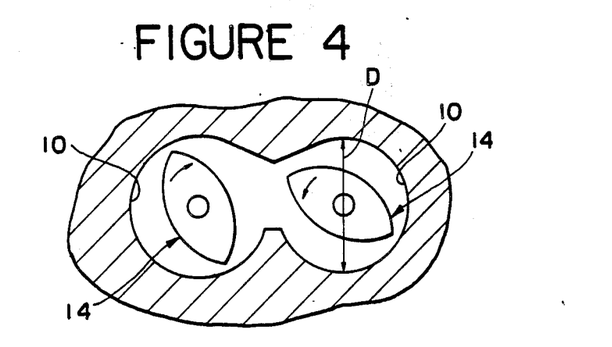
FIG. 4 is a sectional view taken on line B—B of FIG. 2.

The driving portion 19 rotates the rotors 14 in different directions, i.e., in the directions as indicated by the arrows in FIGS. 3 and 4. The driving portion 19 comprises an electric motor and a reduction gear, and the rotors 14 are driven by the motor through the reduction gear.

The discharge portion 12 is composed of an orifice of a three-way fixed wall and a gate 23 of a movable wall of a cylinder 22, and is mounted on the rear end at the lower part of the mixing portion 10. In the drawings, reference numeral 24 designates a dust stop.

Now, the rotor 14 in the two-shaft continuous mixer according to the present invention will be compared with the rotor 1 of prior art shown in FIGS. 5 and 6.

|  | Prior Art | Present Invention |
|---|---|---|
| Number of tips | 2 | 2 |
| Total L"/D | 5 | 5 |
| L'/D of blade | 3.5 | 2.56 |
| L/D from apex to end | 1.66 | 1.52 |
| Blade configuration | continuous | discontinuous |
| Bite angle | 16° | 25° |
| Feed screw | 1 | 2 |
| Apex position of two shafts | deviated | not deviated |
| Speed ratio | 1:1.16 | 1:1 |
| Torsional angle | 30° | 30° |
| Pump blade | no | yes |

Figure 7:
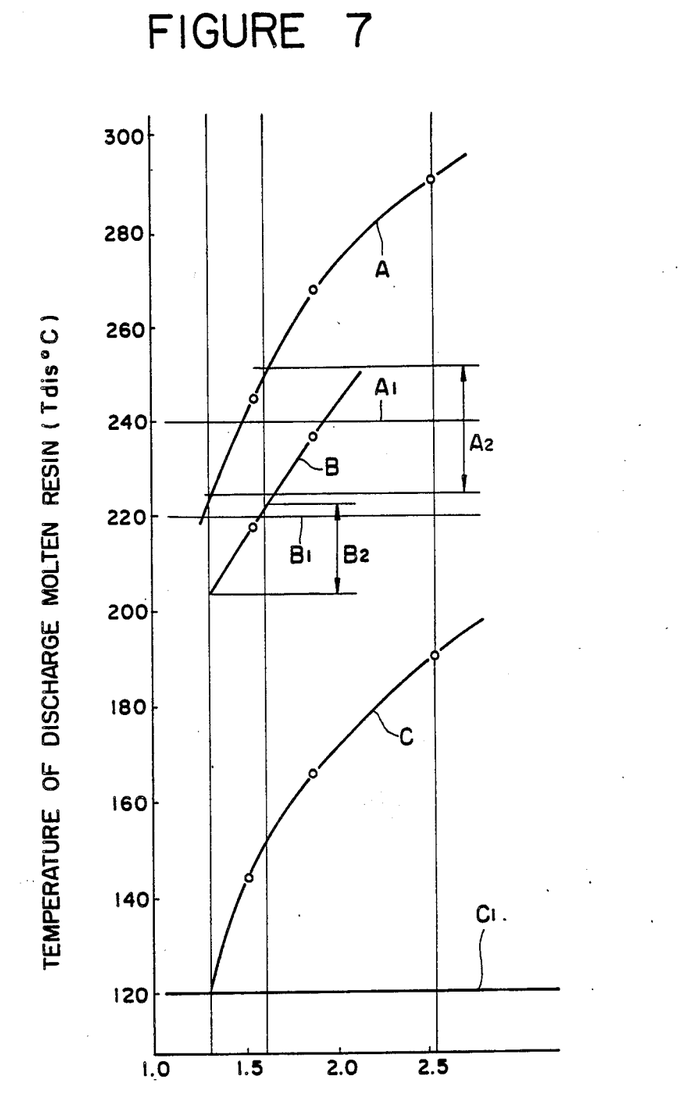
FIG. 7 is a graph showing the relation between the apex position and the temperature of molten resin.

Experimental data are shown in FIG. 7 while comparing the operation and effect between the prior art and the present invention.

In FIG. 7, symbol A indicates the experimental data obtained when high density polyethylene of viscosity index (High load MI) 5 under the condition of production quantity 375 kg/h, number of revolutions 550 rpm and orifice opening degree 75%, and symbol B indicates the experimental data obtained when linear low density polyethylene of viscosity index MI 0.5 is mixed under the condition of a production quantity of 450 kg/h, the number of revolutions being 500 rpm, and the degree of orifice opening being 75%. Symbol C indicates the experimental data obtained when linear low density polyethylene of viscosity index MI 1 is mixed under the condition of a production quantity of 500 kg/h, the number of revolutions 550 rpm, and the degree of orifice opening being 75%.

As will be apparent from these experimental data, a ground that the relation (L/D) between the axial length L from the apex to the discharge end and D is clarified in connection with the temperature of the discharged molten resin at the discharge portion.

More specifically, for the data represented by symbol A, the most favorable upper limit of temperature is 240° as shown by the line A1, and the upper and lower limits are allowed to symbol A2. In the data represented by symbol B, the most favorable upper limit of temperature is 220°/C. as shown by the line B1, and the upper and lower limits are allowed to the symbol B2. In the data represented by symbol C., the lower limit line of temperature is C1.

In the high viscosity resin, 1.6D is controlled by the upper limit of temperature, and in the low viscosity resin, 1.3D is controlled by the limit of heat generation.

Further, the axial length of the mixing blade portion 18 is L', and the inside diameter D is 2.56D in the embodiment of the present invention. In the prior art, the inside diameter is D, and therefore, the axial length in the present invention is shorter than that of the prior art and thus heat generation is low.

In the prior art, L/D from the apex to the end is 1.66D whereas in the present invention, it is 1.52D, and therefore, the shearing action of material is reduced and thus heat generation is low.

In addition, in the prior art, the configuration of the feed blade and return blade is continuous while in the present invention, it is discontinuous. Therefore, in the present invention, a slip-out resistance of material is provided due to the dam effect, and uniform mixing is stabilized.

Moreover, in the present invention, the bite angle is 25°, which is larger than that of the prior art. Thus, low heat generation is provided despite the fact that the mixing which occurs is similar to that of prior art.

Furthermore, in the present invention, two screw portions exist whereas in the prior art only one existed. This means that in the present invention, the stability is enhanced despite the similar low heat generation.

In the prior art, the apex position of two shafts is deviated in an axial direction and the speed ratio is also different, whereas in the present invention, no axial deviation is present and the speed ratio is the same, thus irregularity in the temperature of the molten resin and irregularity in mixing can be prevented.

Next, the mixing control apparatus of the present invention will be described.

Figure 11:
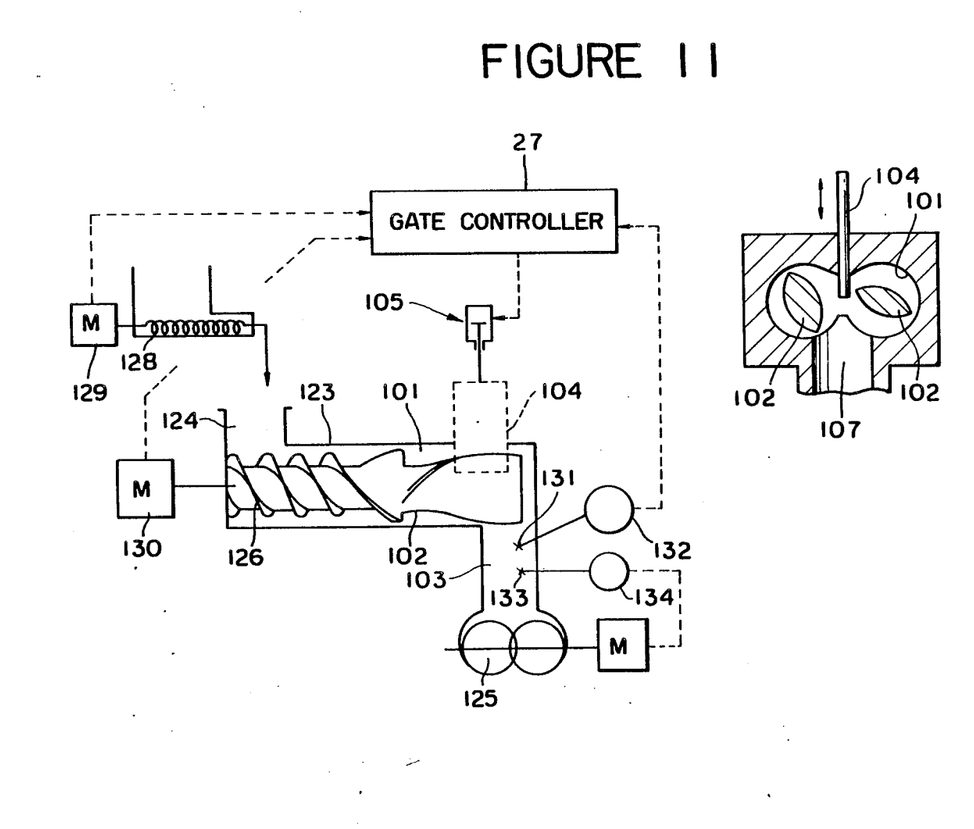
FIG. 11 is an explanatory view of a control system for the embodiment of apparatus.
Figure 12:
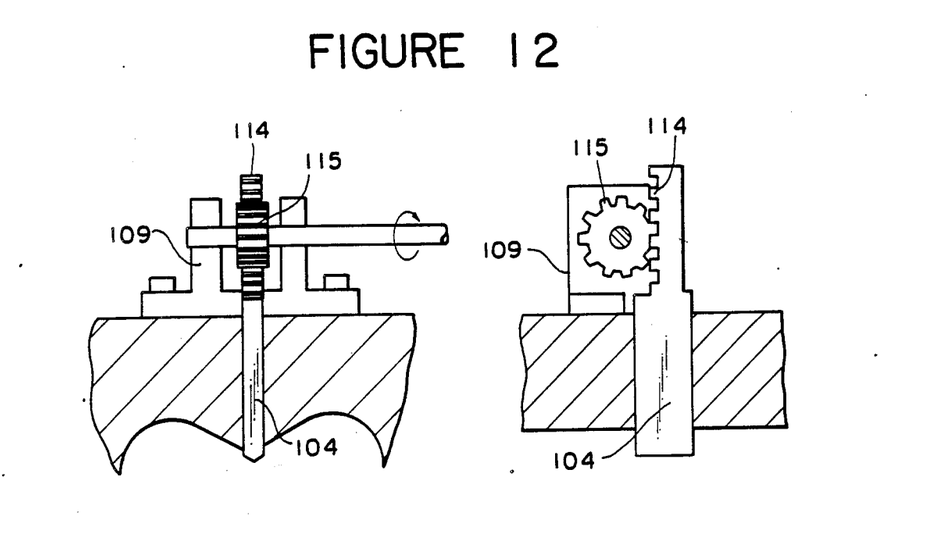
FIGS. 12 through 15 are respectively explanatory views of embodiments of a movable dam direct-drive system.
Figure 13:
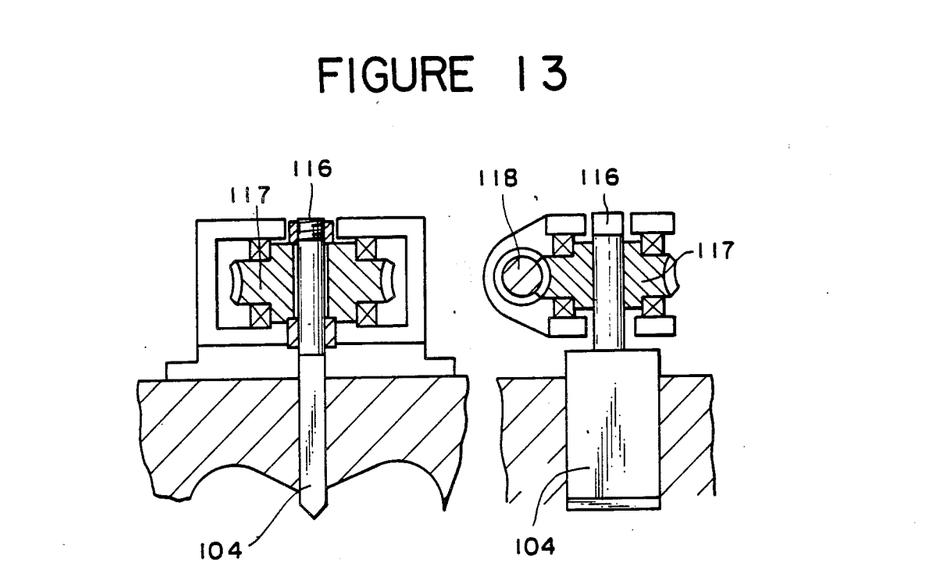
Figure 14:
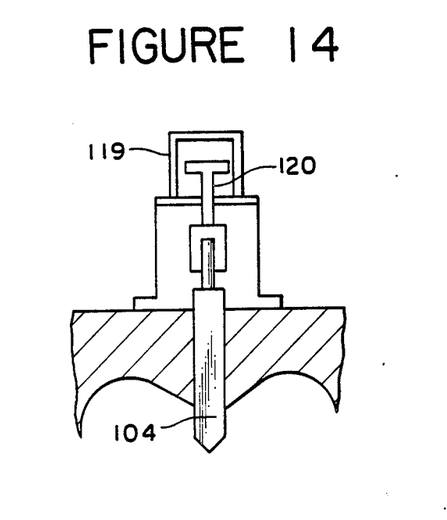
Figure 15:
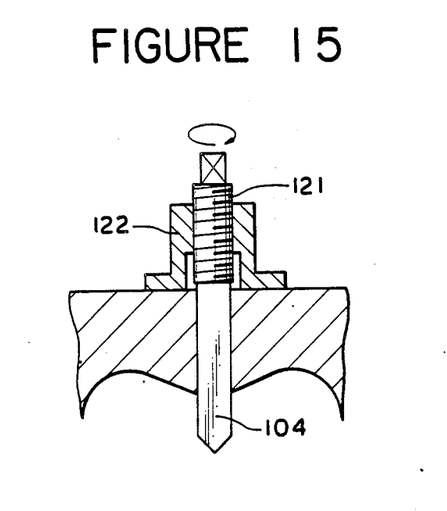

Referring now to FIGS. 8 and 9, while in the illustrated embodiment, two movable dams 104 are shown, it is noted that the number of dams can be determined according to the scale of the mixer chamber 101. The shape of the dam can be either in the form of a plate or a bar, which is of the shape from which a change in shear area and filling degree is obtained and which provides the effect of interrupting an internal flow. In the illustrated embodiment, the movable dams 104 are installed project from the top to the bottom of the chamber 101 but it can project from the bottom to the top of the chamber 101 to obtain the same effect. The position of installation thereof is effective over the full length of the mixing blade portion in the mixing rotors 102, 102, and more particularly, such position is more effective in the side of the discharge blade rather than the return blade. The movable dams 104 may be slidably provided on the outer wall portion of the chamber 101, but in this case, a seal memember 106 must be interposed as shown in FIG. 9 to prevent a leakage of resin material. In FIG. 9, as one example for the driving device 105, an indirect driving system is employed in which the upper end of the movable dam 104 is supported by a swing link 105 pivotally supported on a bracket 109 by a pin shaft 110 through a connection portion comprising a pin shaft 112 and a slot 113, the link 105 being swung to vary an amount of projection of the dam 104. Upward and downward movement of the link 115 is effected by a known motion mechanism such as a screw type, cylinder type, or rack and pinion type motion mechanism. This can be of the direct driving system as shown in FIGS. 12 to 15. More specifically, in FIG. 12, a rack 114 is provided on the movable dam 104, and a pinion 116 of the driving shaft 115 is brought into engagement with the rack 114 (the pinion and rack may be reversely provided). In FIG. 13, the screw type is shown in which a screw shaft 116 is provided on the movable dam 104, and the screw shaft 116 is screwed into a worm wheel 117 which is rotated in an immovable position and a worm 118 is meshed with the worm wheel 117. In FIG. 14, a piston rod 120 of a motor-driven cylinder 119 is connected to the movable dam 104. In FIG. 15, a screw shaft 121 is integrally formed with the movable dam 4 of a rod type, and the screw shaft 121 is screwed into a screw nut 122 for upward and downward movement, and a suitable driving means for adjusting an amount of projection is used. Though not shown, a plurality of dams 104 are disposed parallel to each other in an axial direction to move up and down and vary the dams 104 individually. FIG. 11 shows one example of the control system according to the apparatus of the present invention. Schematically, a continuous mixer body 123 is provided with a material supply opening 124 on one end thereof, and two rotors 102, 102 are provided with mixing blades (a forward blade (feed blade), a rear blade (return blade), a discharge blade, etc. which are known) are provided parallel to each other and movably within the body cylinder having a chamber 101, the mixer body 123 having a material discharge opening 103 on the other end, and a gear pump 125 is directly connected to the discharge opening 103. Reference numeral 126 designates a feeding screw portion provided on the side of the rotor 102 corresponding to the material supply opening 123. IN the control of the movable dam 104, a dam controller 127 is provided to provide control operation of the driving device 105. The controller 127 receives, as input signals, an indication of a supply quantity of material from a driving motor 129 of a material supply device 128 to the material supply opening 124, a value of rotational speed of rotor from a driving motor 130 of rotors 102, and a temperature of mixed material in the maaterial discharge opening 103, from a temperature sensor 131 and a transmitter 132 shown in FIG. 1, whereby the amount of projection into the space 108 of the movable dam 104 may be adequately controlled. On the other hand, in the control of the gear pump 125, a pressure value necessary for stabilized operation of the gear pump 125 is set to the material discharge opening 103 by the pressure sensor 133 and the transmitter 134 shown in FIG. 8, and said set value remains merely set.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A two-shaft continuous mixer, comprising:
an axially horizontally extending mixing portion having a material supply portion on a first end in an axial direction and a discharge portion on a second end in said axial direction;
first and second rotors each of which comprises a feed screw portion and a mixing blade portion composed of a helical feed blade and a helical return blade, said feed blade and said return blade being disposed in said axial direction and first and second shafts respectively of said first and second rotors being arranged within said mixing portion with said feed screw portion position on a side of said material supply portion so that said first and second shafts are disposed parallel to each other, are disengaged from one another and are rotatable in different directions, such that a terminating end of the feed blade in the mixing blade portion and a beginning end of the return blade are deviated in phase in a circumferential direction on a plane traversing the rotor shaft, wherein an axial length from the discharge end in each rotor to an apex position at which the terminating and beginning ends of said blades are positioned on the plane is 1.3 to 1.6 times the inside diameter of the mixing portion, and wherein said first and second shafts are disposed symmetrically in the mixing portion; and
driving means for rotating the first and second rotors at a uniform speed.

2. A two-shaft continuous mixer, comprising:
an axially horizontally extending mixing portion having a material supply portion on a first end in an axial direction and a discharge portion on a second end in an axial direction;
first and second rotors each of which comprises a feed screw portion and a mixing blade portion composed of a helical feed blade and a helical return blade, said feed blade and said return blade being disposed in an axial direction and first and second shafts respectively of said first and second rotors being arranged within said mixing portion with said feed screw portion positioned on the side of said material supply portion so that said first and second shafts are disposed parallel to each other and are disengaged from one another and are rotatable in different directions;
a gear pump which includes discharge control means directly connected to a discharge opening; and
a plurality of movable dams for adjusting a material mixing degree and which adjustably project into a space between said return blades of said first and second rotors in the mixing portion.

3. The two-shaft continuous mixer of claim 2 wherein said movable dams project from a top portion toward a bottom portion of the chamber.

4. The two-shaft continuous mixer of claim 2 wherein said first and second shafts each further comprise a drive shaft portion and a pinion portion and further comprising a rack provided on the movable ram, said rack being meshed with said pinion portion.

5. The two-shaft continuous mixer of claim 2, further comprising a worm and worm wheel mounted on said mixer wherein said movable dam further comprises a screw shaft engaged with said worm wheel.

6. The two-shaft continuous mixer of claim 2, further comprising a hydraulic motor-driven cylinder having a piston rod connected to the movable dam.

7. The two-shaft continuous mixer of claim 2 wherein said movable dam has a screw shaft integrally formed thereon and further comprising a screw nut wherein said screw shaft is screwed into a screw nut for upward and downward movement.

8. A two-shaft continuous mixer, comprising:
an axially horizontally extending mixing portion having a material supply portion on a first end in an axial direction and a discharge portion on a second end in an axial direction;
a first and second rotor each of which further comprises a feed screw portion and a mixing blade portion composed of a helical feed blade and a helical return blade, said feed blade and said return blade being disposed in an axial direction and first and second shafts respectively of said first and second rotors being arranged within said mixing portion with said feed screw portion positioned on the side of said material supply portion so that said first and second shafts are disposed parallel to each other, are disengaged from one another and are rotatable in different directions, wherein a terminating end of the feed blade in the mixing blade portion and a beginning end of the return blade are deviated in phase in a circumferential direction in a plane traversing the rotor shaft, an axial length from the discharge end in each rotor to an apex position at which the terminating and beginning ends of said blades are positioned on the plane is 1.3 to 1.6 times the inside diameter of the mixing portion, and wherein said first and second shafts are disposed symmetrically in the mixing portion;
driving means for rotating the first and second rotors at uniform speed;
a gear pump which includes discharge control means directly connected to a discharge opening; and
a plurality of movable dams for adjusting a degree of material mixing and which adjustably project into a space between said return blades of each of said rotors in the mixing portion.

* * * * *